United States Patent
Liang et al.

(10) Patent No.: US 9,763,299 B1
(45) Date of Patent: Sep. 12, 2017

(54) SURGICAL LIGHT WITH LUMINOUS INTENSITY FINE ADJUSTMENT FUNCTION

(71) Applicant: Amtai Medical Equipment, Inc., Raleigh, NC (US)

(72) Inventors: Clay Liang, Raleigh, NC (US); Chih-Cheng Tseng, New Taipei (TW); Wei-Li Wu, Taichung (TW)

(73) Assignee: AMTAI MEDICAL EQUIPMENT, INC., Raleigh, NC (US)

( * ) Notice: Subject to any disclaimer, the term of this patent is extended or adjusted under 35 U.S.C. 154(b) by 0 days.

(21) Appl. No.: 15/343,221

(22) Filed: Nov. 4, 2016

(51) Int. Cl.
| | |
|---|---|
| A61B 1/06 | (2006.01) |
| H05B 33/08 | (2006.01) |
| G06N 5/02 | (2006.01) |
| F21V 33/00 | (2006.01) |
| F21V 23/00 | (2015.01) |
| F21V 21/28 | (2006.01) |
| F21W 131/205 | (2006.01) |
| F21Y 115/10 | (2016.01) |

(52) U.S. Cl.
CPC ........... H05B 33/0845 (2013.01); G06N 5/02 (2013.01); *F21V 21/28* (2013.01); *F21V 23/008* (2013.01); *F21V 33/0068* (2013.01); *F21W 2131/205* (2013.01); *F21Y 2115/10* (2016.08)

(58) Field of Classification Search
CPC ......... A61B 1/07; A61B 1/045; A61B 1/0638; A61B 1/06; A61B 1/05; A61B 1/0684; A61B 1/0676; A61B 1/00096; H04N 2005/2255; H04N 5/2354; G02B 23/2649
See application file for complete search history.

(56) References Cited

U.S. PATENT DOCUMENTS

| | | | | |
|---|---|---|---|---|
| 2014/0066722 | A1* | 3/2014 | Marka | A61B 19/5202 600/249 |
| 2016/0062103 | A1* | 3/2016 | Yang | G02B 23/2461 250/552 |

* cited by examiner

*Primary Examiner* — Minh D A
(74) *Attorney, Agent, or Firm* — Leong C. Lei

(57) ABSTRACT

Provided is a surgical light with luminous intensity fine adjustment (LIFA) function, which includes a suspension or support system; one or more light heads carried by the suspension or support system; one or more light sources mounted in the light heads for being operable to supply lighting; one or more driving circuits connected to the light sources for being operable to drive the light sources; one or more operation interfaces connected to the driving circuits to allow for adjustment of the luminous intensities of the light sources between a topmost limit value of luminous intensity and a bottommost limit value of luminous intensity; one or more maximum LIFA activation/deactivation manners allowing the operation interfaces or the driving circuits to enter/exit the maximum/minimum LIFA mode for adjusting and storing the topmost/bottommost limit value of luminous intensity.

25 Claims, 2 Drawing Sheets

SURGICAL LIGHT WITH LUMINOUS INTENSITY FINE ADJUSTMENT FUNCTION

(a) TECHNICAL FIELD OF THE INVENTION

The present invention relates generally to a novel surgical light that provides a function for the fine adjustment of luminous intensity, and more particularly to one that's luminous intensity can be raised when the luminous efficiency of the light source drops below a primitive efficiency; this thereby extends the overall service life of the surgical light and allows the surgical light to exhibit accurate and consistent values of illuminance during manufacturing process and use, if the maintenance engineer or a user in the operating room is allowed to make adjustment of the surgical light for optimum illuminance after the installation of the surgical light.

(b) DESCRIPTION OF THE PRIOR ART

Conventional surgical lights that use halogen bulbs as light sources generate steady illuminance when a specific voltage is supplied thereto. Thus, differences in luminous intensities between different light heads are negligible during manufacturing process and use in the field.

On the other hand, recently, the luminous efficiency of light-emitting diodes (LEDs) has significantly improved, so that using LEDs as surgical operation light sources may help extend the service lives of the light sources and also save energy. Thus, the number of surgical lights that use LEDs as a light source is growing. However, for those surgical lights that use LEDs as light sources, differences in illuminances (minimum, maximum and various adjustable incremental stages) between surgical lights in the design phase and those in the mass-production phase are generally too large to be neglected. Consequently, it is generally not possible to make all products in a manufacturing process exhibit an accurate and stable value of illuminance. The reasons are listed below.

(1) LED chips produced by different LED manufacturers may have luminous efficiencies that differ greatly.

(2) The luminous efficiency of an LED chip gets deteriorates significantly with the rise of temperature.

In addition, the luminous efficiency of an LED will also deteriorate with the increase of operation time thereof. Consequently, there is a specific limit of service life of each LED serving as a light source of a surgical light. In the LED industry, the service life of an LED is customarily defined as the time when the luminous efficiency of the LED drops to 70%, or smaller, of the primitive efficiency. This is because when the luminous efficiency of an LED drops to or below 70% of the primitive efficiency, the surgical light that uses the LED may be incapable of supplying sufficient illuminance for the surgical operation area. According to the specification provided by LED manufacturers, when the luminous efficiency of an LED drops to or below 70% of the primitive efficiency, although there may be a "residual" time period in which the service life remains, such a residual time period of the service life is generally not available for sustained and effective use of the surgical light. This amounts to a waste of "illuminance resources".

Further, pupils of human eyes may dilate or constrict for adaptation to the varying light intensity. When the light intensity varies excessively and quickly, the human eye may suffer hyperemia and temporary vertigo may occur. Following such a physiological response, if the illuminance difference between the background illumination area of the operating room and the illumination of the operation area is greater than 10 times, the eyesight of the surgeon in the operating room would transfer from the operation illumination area to the background illumination area, and as explained previously, the eye may suffer hyperemia very quickly and temporary vertigo may occur for a short period of time. Thus, for whatever light source may be adopted, the conventional surgical lights, after being manufactured and shipped, do not allow for the adjustment of the minimum illuminance, the maximum illuminance, and various stages of adjustable illuminance between the minimum illuminance and the maximum illuminance, unless control software is changed or parts are replaced. Otherwise, when the illuminance of the background illumination area of an operating room is relatively low, physiologic issues of the eyes of a surgeon experiencing hyperemia and/or temporary vertigo could not be avoided.

SUMMARY OF THE INVENTION

The primary objective of the present invention is to allow for the raising of luminous intensity when the luminous efficiency of the light source drops below the primitive efficiency thereof, to thereby extend the overall service life of the surgical light, so that in addition to allowing surgical lights to exhibit accurate and consistent values of illuminance during a manufacturing process, a maintenance engineer or use in the operating room is able to make adjustment to the surgical light for optimum illuminance after the installation of the surgical light.

To achieve the above object, the present invention provides a surgical light with luminous intensity fine adjustment (hereafter referred to as LIFA) function, which comprises: a suspension or support system; one or more light heads, which are carried by the suspension or support system; one or more light sources, which are mounted in the light heads for being operable to supply lighting; one or more driving circuits, which are connected to the light sources to drive the light sources; one or more operation interfaces, which are connected to the driving circuits to allow a manufacturing operator, an operating room user, or an installation/maintenance engineer to adjust, as desired, the luminous intensities of the light sources, between a topmost limit value of luminous intensity and a bottommost limit value of luminous intensity; one or more maximum LIFA activation manners, which allows the operation interfaces or the driving circuits to enter a maximum LIFA mode for adjusting the topmost limit value of luminous intensity; and one or more maximum LIFA deactivation manners, which allow the operation interfaces or the driving circuits to exit the maximum LIFA mode and store the topmost limit value of luminous intensity.

In an embodiment of the present invention, one or more minimum LIFA activation manners are further included to allow the operation interfaces or the driving circuits to enter a minimum LIFA mode for adjusting a bottommost limit value of luminous intensity.

In an embodiment of the present invention, one or more minimum LIFA deactivation manners are further included to allow the operation interfaces or the driving circuits to exit the minimum LIFA mode and store the bottommost limit value of luminous intensity.

In an embodiment of the present invention, the driving circuits comprise one or more central processing units, which provide control and processing for the light sources, the operation interfaces, and storing of the topmost limit value of luminous intensity.

In an embodiment of the present invention, the driving circuits comprise one or more central processing units, which provide control and processing for the light sources, the operation interfaces, and storing of the topmost and bottommost limit values of luminous intensity.

In an embodiment of the present invention, the central processing units comprise programs of artificial intelligence, which are operable to, but not limited thereto, automatic re-writing of the topmost limit value of luminous intensity of the programs.

In an embodiment of the present invention, the central processing units comprise programs of artificial intelligence, which are operable to, but not limited thereto, automatic re-writing of the topmost and bottommost limit value of luminous intensity of the programs.

In an embodiment of the present invention, one or more storage element are further included for storing, but not limited thereto, the topmost limit value of luminous intensity.

In an embodiment of the present invention, the storage elements comprise flash memory.

In an embodiment of the present invention, the storage elements are components included in the driving circuits.

In an embodiment of the present invention, the storage elements are included in the central processing units.

In an embodiment of the present invention, one or more storage elements are further included for storing, but not limited thereto, the topmost and bottommost limit values of luminous intensity.

In an embodiment of the present invention, the light sources are light-emitting diodes.

In an embodiment of the present invention, the maximum LIFA activation manners and the maximum LIFA deactivation manners are achieved through operation of the operation interfaces that are located outside the light heads of the surgical light.

In an embodiment of the present invention, the maximum LIFA activation manners, the maximum LIFA deactivation manners, the minimum LIFA activation manners, and the minimum LIFA deactivation manners are achieved through operation of the operation interfaces located outside the light heads of the surgical light.

In an embodiment of the present invention, the maximum LIFA activation manners and the maximum LIFA deactivation manners are achieved through operation of the operation interfaces that are located inside the light heads of the surgical light.

In an embodiment of the present invention, the maximum LIFA activation manners, the maximum LIFA deactivation manners, the minimum LIFA activation manners, and the minimum LIFA deactivation manners are achieved through operation of the operation interfaces located inside the light heads of the surgical light.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described, without departing from the scope of the invention, as set forth in the appended claims.

Figure 1:
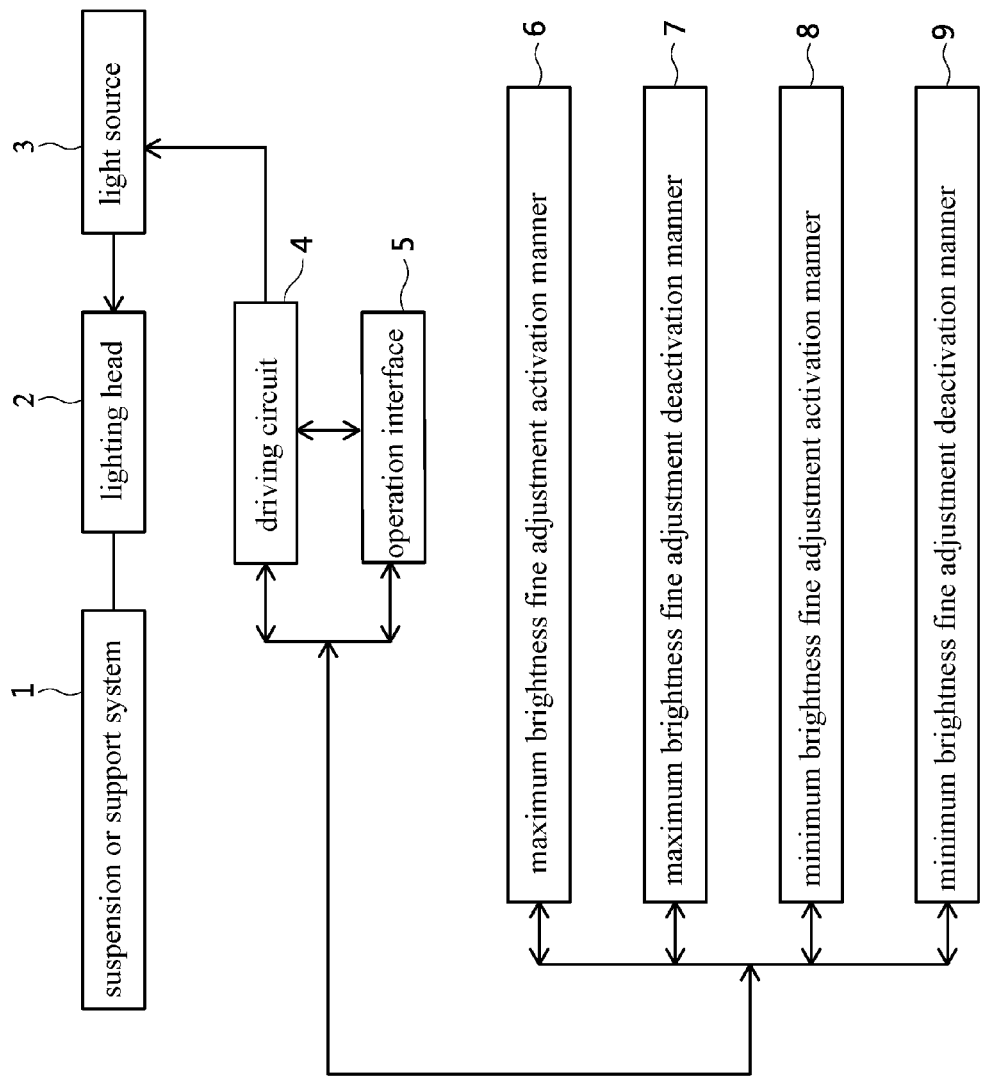
FIG. 1 is a schematic view showing a basic configuration of the present invention.
Figure 2:
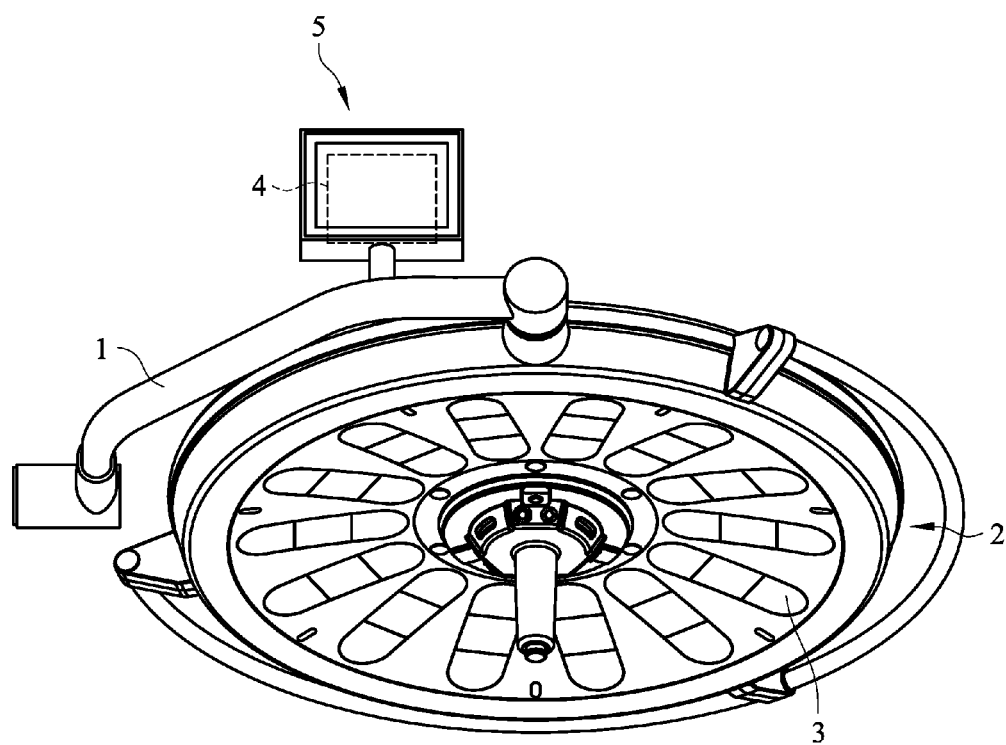
FIG. 2 is a schematic view illustrating an embodiment structure of the present invention.

Referring to FIGS. 1 and 2, which are respectively a schematic view showing a basic configuration of the present invention and a schematic view illustrating an embodiment structure of the present invention. As shown in the drawings, the present invention provides a surgical light with LIFA function, which comprises, at least (1) a suspension or support system, (2) One or more light heads, (3) One or more light sources, (4) One or more driving circuits, (5) One or more operation interfaces, (6) One or more maximum LIFA manners, and (7) One or more maximum LIFA deactivation manners 7.

The suspension or support system (1) is bendable or rotatable to any desired angle.

The light head (2) is carried by the suspension or support system (1).

The light sources (3) are mounted in the light head (2) for being operable to supply lighting, wherein the light sources (3) are light-emitting diodes.

The driving circuits (4) are connected to the light sources (3) for being operable to drive the light sources (3).

The operation interfaces (5) are connected to the driving circuits (4) to allow manufacturing operators, operating room users, or installation/maintenance engineers to adjust, as desired, the luminous intensities of the light sources (3) between a topmost limit value of luminous intensity and a bottommost limit value of luminous intensity.

The maximum LIFA activation manners (6) allow the operation interfaces (5) or the driving circuits (4) to enter a maximum LIFA mode for adjusting the topmost limit value of luminous intensity.

The maximum LIFA deactivation manners (7) allow the operation interfaces (5) or the driving circuits (4) to exit the maximum LIFA mode and store the topmost limit value of luminous intensity.

Further, the present invention also comprises one or more minimum LIFA activation manners (8), which allow the operation interfaces (5) or the driving circuits (4) to enter a minimum LIFA mode for adjusting the bottommost limit value of luminous intensity, and one or more minimum LIFA deactivation manners (9), which allow the operation interfaces (5) or the driving circuits (4) to exit the minimum LIFA mode and store the bottommost limit value of luminous intensity, wherein the maximum LIFA activation manners (6), the maximum LIFA deactivation manners (7), the minimum LIFA activation manners (8), and the minimum LIFA deactivation manners (9) are all achieved by means of operating the operation interfaces (5) arranged inside or outside the light head (2) of the surgical light. Operation interfaces 5 arranged inside the light head (2) of the surgical light are suitable for use by the manufacturing operators or the installation/maintenance engineers; and operation interfaces (5) arranged outside the light head (2) of the surgical light are suitable for use by the installation/maintenance engineers or operating room users.

Further, the driving circuits (4) comprise one or more central processing units and storage elements (not shown). The central processing units provides control and processing for the light sources (3), the operation interfaces (5), and storing of the topmost and bottommost limit values of luminous intensity and the central processing units comprise programs of artificial intelligence, which are applicable to, but not limited to, automatic re-writing the topmost and bottommost limit values of luminous intensity contained in the programs. The storage elements are applicable to, but not limited to, storing the topmost and bottommost limit values of luminous intensity, wherein the storage elements are flash memories. In addition, the storage elements can be components included in the driving circuits (4) or included in the central processing units.

For installation and use in an operating room, a range of illuminance within a distance of 100 centimeters measured from a center of an undersurface of the light head (2) of the surgical light toward the outside should be between a maximum of 160,000 Lux and a minimum of 40,000 Lux. Although the driving circuits (4) may be loaded therein driving values corresponding to 160,000 Lux and 40,000 Lux, quality of the light sources (3) themselves and tolerances of illuminance meters may affect the final reading of illuminance. To handle such a problem, each of the light sources (3) is allowed to have the fine adjustment modes for the topmost and bottommost limit values of luminous intensity, in order to re-set and memorize the values for driving 160,000 Lux and 40,000 Lux.

Further, the operation interfaces (5) are operable for adjusting, in multiple stages, the luminous intensity, such as eight stages of incremented luminous intensity, in an arithmetic series, 40,000 Lux, 55,000 Lux, 70,000 Lux, 85,000 Lux, 100,000 Lux, 115,000 Lux, 130,000 Lux, and 145,000 Lux, or alternatively, eight stages of incremented luminous intensity, in a geometric series (common ratio 1.2), 40,000 Lux, 48,000 Lux, 57,600 Lux, 69,120 Lux, 82,944 Lux, 99,533 Lux, 119,439 Lux, and 143,327 Lux. Explanation of light adjustment with the operation interfaces (5) is provided below.

When the operation interfaces (5) are arranged inside the light head (2) of the surgical light, they are suitable for use by the manufacturing operators or the installation/maintenance engineers; and when the operation interfaces (5) are arranged outside the light head (2) of the surgical light, they are suitable for use by the installation/maintenance engineers or operating room users, wherein:

1) When the light head (2) is in an illumination mode, the light source (3) is first set through the driving circuit (4) to the maximum luminous intensity and then, the maximum LIFA activation manner (6) is applied to have the light source (3) entered the maximum LIFA mode and, upon completion of an adjustment operation, switched to the maximum LIFA deactivation manner (7), so that a driving value that is newly set for the maximum luminous intensity of the light source (3) is automatically stored in the driving circuit (4) and the fine adjustment mode is exited for returning back to the illumination mode.

2) In a condition of being in the illumination mode, the light sources (3) is first set to the minimum luminous intensity and then, the minimum LIFA activation manner (8) is applied to have the light source (3) entered the minimum LIFA mode and, upon completion of an adjustment operation, switched to the minimum LIFA deactivation manner (9), so that a driving value that is newly set for the minimum luminous intensity of the light source (3) is automatically stored in the driving circuit (4) and the fine adjustment mode is exited for returning back to the illumination mode.

In summary, the present invention provides a surgical light with LIFA function, which could effectively overcome the drawbacks of the prior art and may raise the luminous intensity of a light source when the luminous efficiency of the light source drops below the primitive efficiency thereof to thereby extend the overall service life of the surgical light. And, in addition to allowing surgical lights to exhibit accurate and consistent values of illuminance during a manufacturing process, an installation/maintenance engineer or a user in an operating room is allowed to make adjustments to the surgical light for optimum illuminance after the installation of the surgical light.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A surgical light with luminous intensity fine adjustment function (hereafter referred to as LIFA), comprising:
   a suspension or support system;
   one or more light heads, which are carried by the suspension or support system;
   one or more light sources, which are mounted in the light heads for being operable to supply lighting;
   one or more driving circuits, which are connected to the light sources for being operable to drive the light sources;
   one or more operation interfaces, which are connected to the driving circuits to allow a manufacturing operator, an operating room user, or an installation/maintenance engineer to adjust, as desired, the luminous intensities of the light sources between a topmost limit value of luminous intensity and a bottommost limit value of luminous intensity;
   one or more maximum LIFA activation manners, which allows the operation interfaces or the driving circuits to enter a maximum LIFA mode for adjusting the topmost limit value of luminous intensity; and
   one or more maximum LIFA deactivation manners, which allow the operation interfaces or the driving circuits to exit the maximum LIFA mode and store the topmost limit value of luminous intensity.

2. The surgical light with luminous intensity fine adjustment function according to claim 1 further comprising one or more minimum LIFA activation manners, which allow the operation interfaces or the driving circuits to enter a minimum LIFA mode for adjusting a bottommost limit value of luminous intensity.

3. The surgical light with LIFA function according to claim 2 further comprising one or more minimum LIFA deactivation manners, which allow the operation interfaces or the driving circuits to exit the minimum LIFA mode and store the bottommost limit value of luminous intensity.

4. The surgical light with LIFA function according to claim 3, wherein the driving circuits comprise one or more central processing units, which provide control and processing for the light sources, the operation interfaces, and storing of the topmost and bottommost limit values of luminous intensity.

5. The surgical light with LIFA function according to claim 4, wherein the central processing units comprise programs of artificial intelligence, which are operable to, but not limited thereto, automatic re-writing of the topmost and bottommost limit value of luminous intensity of the programs.

6. The surgical light with LIFA function according to claim 5, wherein the light sources are light-emitting diodes.

7. The surgical light with LIFA function according to claim 3, wherein the light sources are light-emitting diodes.

8. The surgical light with LIFA function according to claim 3, wherein the maximum LIFA activation manners, the maximum LIFA deactivation manners, the minimum LIFA activation manners, and the minimum LIFA deactivation manners are achieved through operation of the operation interfaces located outside the light heads of the surgical light.

9. The surgical light with LIFA function according to claim 3, wherein the maximum LIFA activation manners, the maximum LIFA deactivation manners, the minimum LIFA activation manners, and the minimum LIFA deactivation manners are achieved through operation of the operation interfaces located inside the light heads of the surgical light.

10. The surgical light with LIFA function according to claim 4 further comprising one or more storage elements for storing, but not limited thereto, the topmost and bottommost limit values of luminous intensity.

11. The surgical light with LIFA function according to claim 1, wherein the driving circuits comprise one or more central processing units, which provide control and processing for the light sources, the operation interfaces, and storing of the topmost limit value of luminous intensity.

12. The surgical light with LIFA function according to claim 4, wherein the central processing units comprise programs of artificial intelligence, which are operable to, but not limited thereto, automatic re-writing of the topmost limit value of luminous intensity of the programs.

13. The surgical light with LIFA function according to claim 12, wherein the light sources are light-emitting diodes.

14. The surgical light with LIFA function according to claim 11 further comprising one or more storage elements for storing, but not limited thereto, the topmost limit value of luminous intensity.

15. The surgical light with LIFA function according to claim 14, wherein the storage elements comprise flash memory.

16. The surgical light with LIFA function according to claim 14, wherein the storage elements are components included in the driving circuits.

17. The surgical light with LIFA function according to claim 16, wherein the light sources are light-emitting diodes.

18. The surgical light withLIFA function according to claim 14, wherein the storage elements are included in the central processing units.

19. The surgical light with LIFA function according to claim 18, wherein the storage elements comprise flash memory.

20. The surgical light with LIFA function according to claim 18, wherein the storage elements are components included in the driving circuits.

21. The surgical light with LIFA function according to claim 20, wherein the light sources are light-emitting diodes.

22. The surgical light with LIFA function according to claim 18, wherein the storage elements are included in the central processing units.

23. The surgical light with LIFA function according to claim 1, wherein the light sources are light-emitting diodes.

24. The surgical light with LIFA function according to claim 1, wherein the maximum LIFA activation manners and the maximum LIFA deactivation manners are achieved through operation of the operation interfaces that are located outside the light heads of the surgical light.

25. The surgical light with LIFA function according to claim 1, wherein the maximum LIFA activation manners and the maximum LIFA deactivation manners are achieved through operation of the operation interfaces that are located inside the light heads of the surgical light.

* * * * *